F. MACKEY.
SPRING FRAME FOR MOTOR CYCLES.
APPLICATION FILED APR. 25, 1912.

1,142,344.

Patented June 8, 1915.
2 SHEETS—SHEET 1.

Witnesses
H. M. Gillespie
A. L. Phelps

Inventor
Frank Mackey
By
C. O. Shepherd
Attorney

F. MACKEY.
SPRING FRAME FOR MOTOR CYCLES.
APPLICATION FILED APR. 25, 1912.
1,142,344.
Patented June 8, 1915.
2 SHEETS—SHEET 2.
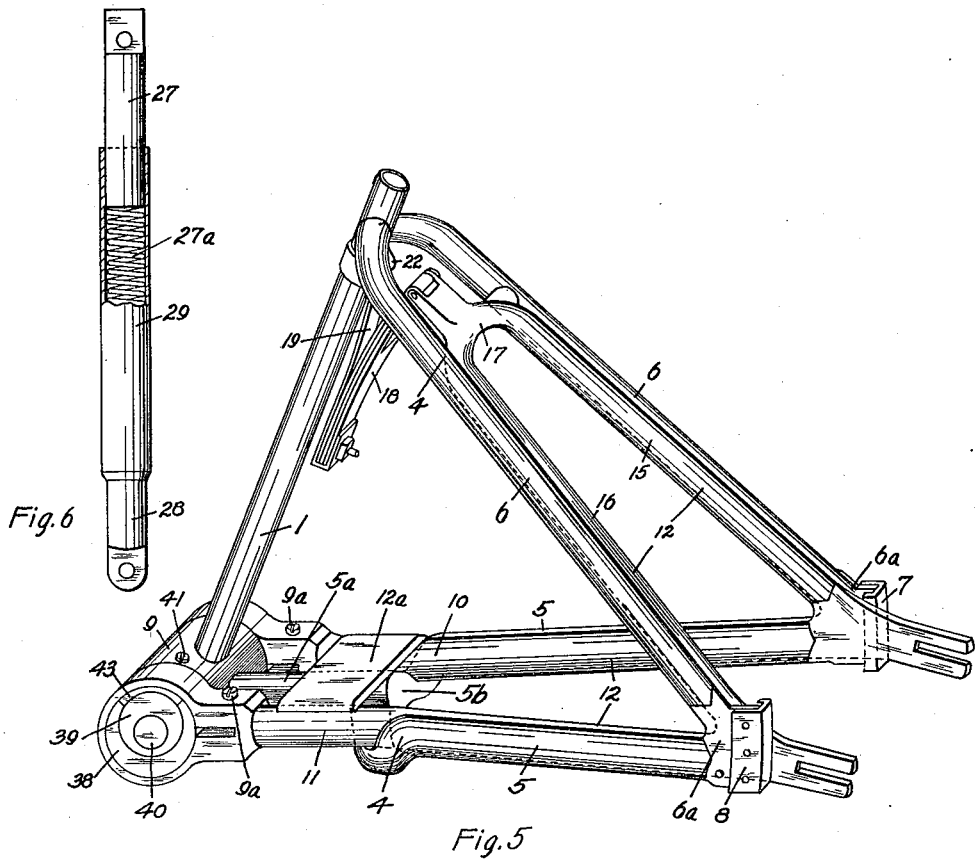

UNITED STATES PATENT OFFICE.

FRANK MACKEY, OF NEWARK, OHIO.

SPRING-FRAME FOR MOTOR-CYCLES.

1,142,344.  Specification of Letters Patent.  Patented June 8, 1915.

Application filed April 25, 1912. Serial No. 693,239.

*To all whom it may concern:*

Be it known that I, FRANK MACKEY, a citizen of the United States, residing at Newark, in the county of Licking and State of Ohio, have invented certain new and useful Improvements in Spring-Frames for Motor-Cycles, of which the following is a specification.

My invention relates to spring frames for motorcycles and is particularly directed to the provision of a rear structure of a motorcycle which is calculated to give varying spring actions and resistances dependent upon the conditions under which the vehicle is running. In other words, it relates to the provision of a rear wheel structure for motorcycles which is calculated to automatically vary the resistance conditions, this being primarily effected by the provision of a spring element which is capable of constantly changing its bearing point and thereby changing the degree of resistance offered. In the preferred embodiment of this idea, I utilize a rigid rear fork structure and a floating fork structure, which floating fork structure is designed to carry the wheel and is designed to resist pressure upon the same by a spring element mounted upon the framework of the machine and having a variant arcuate resistance, being preferably rigidly mounted at one end and being connected at the other end to the floating fork in a manner to govern the yielding action thereof.

My invention further contemplates the provision of a means for preventing rattling of the framework due to this automatic adjustment.

My invention further aims to provide a means for readily adapting the motorcycle structure to use as a tandem, by the provision of a supplemental seat upon the rear of the vehicle and by the conjunctive provision of a tubular resistance element to be hereinafter described.

Furthermore, my invention contemplates a means for adjusting the tautness of the driving chain, while at the same time maintaining a constant line of transmission.

Figure 1:
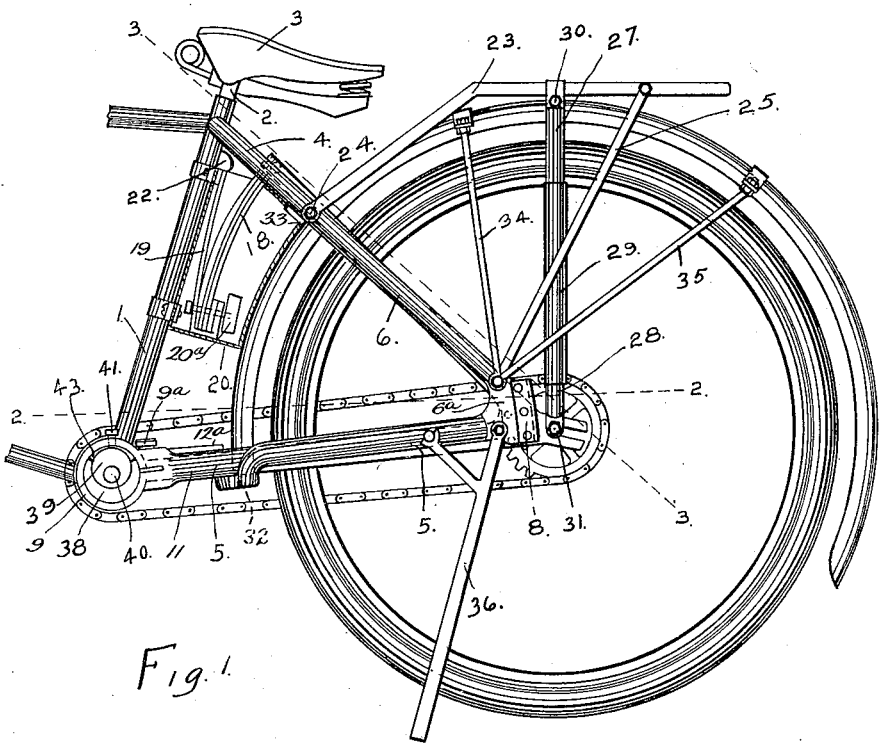
Figure 2:
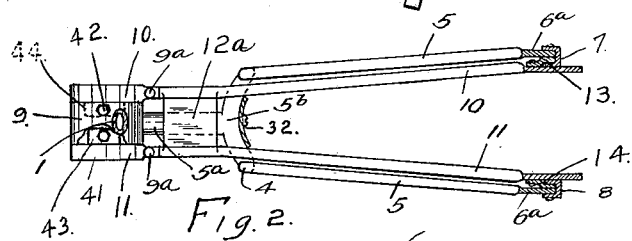
Figure 3:
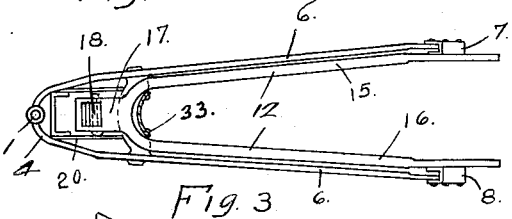
Figure 4:
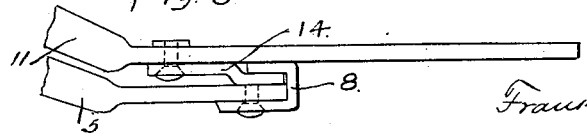

The preferred embodiment of my invention is shown in the accompanying drawings, in which similar characters of reference designate corresponding parts, and in which:

Figure 1 is a side elevation of the rear wheel structure of a motorcycle fitted with my improvement, Fig. 2 is a section taken on line 2—2 of Fig. 1, Fig. 3 is a section taken on line 3—3 of Fig. 1, Fig. 4 is a detail view of the guideway serving as an adjusting anti-rattler for the floating fork, Fig. 5 is a detail perspective of the rigid and floating fork structure used by me, and, Fig. 6 is a detail partly in elevation and partly in section, of a supplemental resistance element sometimes used by me.

In the drawings, the motorcycle structure is shown as comprising an upright member 1 of the main frame, carrying a saddle post 2 and saddle 3. The spring construction proper is shown as comprising a rear fork 4 rigidly connected to the main frame structure and formed of converging bifurcated legs 5 and 6, the legs upon each side being connected together as at $6^a$, where there are rigidly connected channel elements or slide members designated 7 and 8 respectively. It will be noted that the upright 1 is a permanent part of the motorcycle main structure, one portion of the rigid fork structure extending rearwardly from the crank hanger 9 in the form of a single rod $5^a$ and being divided as at $5^b$ to form a portion of this structure, and the other member 6 of the rigid fork structure extending rearwardly and downwardly from a point adjacent the saddle element 3 in the form of a bifurcation its entire length. The construction thus far described is similar in many respects to the ordinary motor or bicycle structure now in use.

Extending rearwardly from the crank hanger 9 and disposed one upon either side thereof, are legs 10 and 11 of the floating fork structure 12, such legs 10 and 11 being pivotally mounted about the crank hanger and being joined as at $12^a$ for a purpose to be hereinafter described. The floating fork structure 12 is somewhat similar in shape to the rigid fork structure 4 and is completed by the provision of downwardly and rearwardly inclined members 15 and 16. This floating fork structure is designed to carry the wheel as indicated and is also provided with slide elements 13 and 14 located at approximately the point of jointure of the legs 10 and 15 and legs 11 and 16 and are designed to coöperate with the slide channel members 7 and 8. The upward extensions 15 and 16 join as at 17 at a point somewhat spaced from the main frame structure and are connected to the free end of a leaf spring 18 supported at its opposite end from a strap or backing element 19 rigidly mounted upon the main frame structure and incased within a casing 20. This casing 20 may be of any suitable form for housing the spring 18, it being necessary only that the spring be permitted sufficient play. It will be noted that the various leaves of this spring are bolted together at their lower end and this bolt structure is accessible through an aperture 20$^a$ in the housing 20.

In the operation of the structure as thus far described, the floating fork may swing about its pivot at the crank hanger 9, while its rear extremity is slidingly housed within the slideways 7 and 8, the upward or downward movement of the floating fork being resisted by the spring element 18. After its upward movement, the floating fork is prevented from excessive rebound downward by the joining member 12$^a$, which limits the downward movement of the floating fork by contact with the short single rod 5$^a$ of the rigid fork structure, thus serving as a buffer in addition to strengthening the structure by its joining of the legs 10 and 11. The slide members 13 and 14 carried by the floating fork operate in the channel members 7 and 8 rigidly carried by the rigid fork structure and relieve the strain put upon the pivot points of the legs 10 and 11 due to the tendency to lateral movement of the rear wheel while in motion. These slide members and guideways also serve the purpose of preventing rattling of the rear structure due to this lateral movement and vibration. The screws 9$^a$ are used to draw up the split portions of the ends of the rearwardly extending legs 10 and 11 where they embrace the crank hanger 9 to form their pivotal connections and in this manner means are provided for regulating the freedom of movement about the pivot point of these legs.

The spring element 18 is peculiarly designed so that pressure upon the same varies its bearing point and consequently varies the effective length of the spring. Thus, when a greater weight is applied to the spring, a certain portion thereof comes into contact with the supporting strap 19 and shortens the spring, thus giving it a greater resistance capacity. The complete forcing of the spring forwardly is guarded against by the provision of a resilient buffer element 22 which is in a position to receive the free extremity of the spring element.

The rigid fork of the frame may be provided with a luggage carrier element 23 rigidly connected thereto at 24 and having a rigid brace 25. In conjunction with this element, I may utilize a detachable supplemental resistance structure comprising a plunger 27 operating within a casing 29 carried by the member 28 and provided with a resistance coiled spring 27$^a$. The sections 27 and 28 are detachably secured as at 30 and 31 to the luggage carrier and the floating fork respectively. It is of importance to provide a means for applying an additional spring for the reason that the placing of luggage or the seating of an additional person upon this luggage carrier, would otherwise render the spring 18 practically inoperative by forcing it into continued contact with the buffer 22. However, by the provision of this additional spring element, the spring 18 is supplemented and there results ample resistance to the weight of both rider and luggage or of both riders.

It will be understood that the leaf spring 18 is designed to cushion the rear wheel for one rider only and if it is desired to place additional weight upon this wheel, the supplemental resistance element is attached, it being understood that it is removed from operation when the motorcycle is carrying only one person. This supplemental resistance element having its spring normally under tension acts between the rigid fork structure and the floating fork structure through the medium of the luggage carrier and its initial tension is calculated to be sufficient to approximately counterbalance the weight of an additional passenger or luggage, thereby leaving the spring 18 to compensate for one person only.

To facilitate adjustment of the rear transmission element of the motorcycle, I have provided eccentrics 38 and 39 carried upon the axis 40 and these eccentrics are designed to be simultaneously adjusted. They are held in their adjusted position by set screws 41 and 42, the set screw 41 desirably operating in a groove 43 in the inner eccentric and thereby preventing lateral movement thereof. Lateral movement of the outer eccentric is of course prevented by the slot 44 through which the set screw 42 passes. It will be understood that the transmission element may be readily tightened or loosened as desired, by moving the comparatively large portion of one of the eccentrics rearwardly and by compensating for the vertical movement by adjustment of the other eccentric. In other words, rotation of the inner eccentric to bring the enlarged portion thereof toward the rear, would raise the line of transmission and to compensate for this it would be necessary to shift the outer eccentric so as to permit the line of transmission to remain normal. By operating these eccentrics together, I am enabled to obtain a three-quarters of an inch adjustment with an unchanged line of transmission, the aim of which will be apparent. This maintenance of the unchanged line of transmission, is of utmost importance particularly in the utilization of a chain drive for the motorcycle. Whenever a floating fork structure is used, there is a tendency of the vehicle wheel to move up and down and in such upward and downward movement, the drive upon the transmission element is constantly varying. Even with a belt drive this variable tendency must be guarded against, for if there is no means for maintaining the proper line of transmission, such constant change of position of the line of drive must inevitably stretch the belt. If a chain is used, it is practically impossible to preclude breaking of the chain unless the chain be maintained so loose as to create a liability for the chain to come off. With my double eccentric adjustment, I am able to always maintain the proper degree of tautness for the chain.

As is customary, I utilize a mud guard which is secured as at 32 and 33 to the rigid fork structure, being further supported by braces 34 and 35 likewise connected to the rigid frame structure. Also, there is shown a support 36 which may be of any suitable type.

In the proper embodiment of my invention, the rear wheel is capable of an upward yielding movement and the resistance to this upward yielding movement is effected and measured by the relative curvature of the spring 18 and strap 19 in a manner which will be well understood.

What I claim, is:

1. A spring frame for motorcycles comprising a main frame, a rigid fork carried by said frame, a V-shaped floating fork member, one pair of legs of said member being pivotally supported by said main frame, a resilient resistance element carried by said main frame and bearing on the ends of the other pair of legs of said V-shaped floating member, and guiding means carried by said forks for preventing lateral movement of the wheel carrying end of said floating fork independent of its pivotal connection.

2. A spring frame for motorcycles comprising a main frame, a rigid V-shaped fork carried by said frame, a V-shaped floating fork member, one pair of legs of said member being pivotally supported by said main frame, a resilient resistance element carried by said main frame and bearing on the ends of the other pair of legs of said V-shaped floating forked member, and guiding means carried by said forks for preventing lateral movement of the wheel carrying end of said floating fork independent of its pivotal connection.

3. A spring frame for motorcycles comprising a main frame, a rigid fork forming a portion thereof, a floating fork pivoted to said main frame, a resilient resistance element operatively connected between said forks, U-shaped channel guide elements carried by one of said forks, and slide members slidably fitting between the legs of said guide elements and carried by the other of said forks, said guide elements and slide members being located at the opposite ends of said forks from the pivotal mounting of said floating fork to maintain a predetermined path of movement of said floating fork independent of its pivotal connection.

4. A spring frame for motorcycles comprising a main frame, a resiliently supported rear wheel, a luggage carrier attached to said main frame over said rear wheel, and a supplemental resistance element for use with said carrier and operatively connected between said main frame and said wheel.

5. A spring frame for motorcycles comprising a main frame, a resiliently supported rear wheel, a luggage carrier attached to said main frame over said rear wheel, and a supplemental detachable resistance element for use with said carrier and operatively connected between said main frame and said wheel.

6. A spring frame for motorcycles comprising a main frame, a floating fork, a resilient resistance element for said fork, a luggage carrier, and a supplemental resistance element for use with said carrier attached to said main frame over said floating fork and operatively connected between said main frame and said fork.

7. A spring frame for motorcycles, comprising a main frame, a rigid fork, a floating fork, a resilient resistance element for said floating fork, a luggage carrier attached to said main frame over said floating fork, and a supplemental detachable resistance element for use with said carrier and operatively connected between said forks.

8. A spring frame for motorcycles, comprising a main frame, a rigid fork, a floating fork, a resilient resistance element for said floating fork, a luggage carrier carried by said rigid fork over said floating fork, and a supplemental resistance element for use with said carrier operatively interposed between said rigid and floating forks.

9. A spring frame for motorcycles comprising a main frame, a rearwardly extending rigid fork forming a portion of said main frame, a rearwardly extending floating fork pivotally mounted on said main frame, and a resilient resistance element operatively connected between said forks, said two forks being so formed that they engage each other on reverse or rebound movement of said floating fork before said resistance element has reached its limit of flexing.

10. A spring frame for motorcycles comprising a main frame, a rearwardly extending rigid fork forming a portion of said main frame, a rearwardly extending floating fork pivotally mounted on said main frame, and a resilient resistance element operatively connected between said forks, one of said forks being constructed to cross and limit the path of movement of said floating fork on reverse or rebound movement.

11. A spring frame for motorcycles comprising a main frame, a rearwardly extending rigid fork forming a portion of said main frame, a rearwardly extending floating fork pivotally mounted on said main frame, and a resilient resistance element operatively connected between said forks, one of said forks being constructed so that a portion of it lies between the two legs of the other fork, and a portion of it lies outside the two legs of the other fork.

12. A spring frame for motorcycles comprising a main frame, a rearwardly extending rigid fork forming a portion of said main frame, a rearwardly extending floating fork pivotally mounted on said main frame, a resilient resistance element operatively connected between said forks, one of said forks being movable up and down between the legs of the other, and a spanning member between the legs of the wider fork to limit the reverse or rebound movement of said floating fork.

In testimony whereof I affix my signature in presence of two witnesses.

FRANK MACKEY.

Witnesses:
E. P. Corbert,
Walter E. L. Bock.

Copies of this patent may be obtained for five cents each, by addressing the "Commissioner of Patents, Washington, D. C."